3,257,460
PREPARATION OF TERTIARY PHOSPHINES
Irving Gordon, Niagara Falls, and George M. Wagner, Lewiston, N.Y., assignors to Hooker Chemical Corporation, Niagara Falls, N.Y., a corporation of New York
No Drawing. Filed Jan. 24, 1962, Ser. No. 168,533
12 Claims. (Cl. 260—606.5)

This invention relates to the preparation of tertiary phosphines.

Tertiary phosphines have been used as intermediates in the preparation of other phosphorus compounds, as heat and light stabilizers for polymers, as ingredients of flameproofing compositions for cellulosic materials and as gasoline additives.

Heretofore, it has not been possible to prepare substantially pure tertiary phosphines from phosphonium compounds derived from aldehydes or ketones without employing numerous complicated and costly purification steps. Methods based on the reaction between a phosphonium compound derived from an aldehyde or ketone and sodium hydroxide form a highly viscous reaction product mixture containing tertiary phosphine, an aldehyde or ketone and a sodium salt.

Costly recrystallization and filtration steps are necessary in order to isolate a pure tertiary phosphine from such a mixture. Without purification, the isolated tertiary phosphine is highly contaminated with the carbonyl compound and a salt.

Methods based on the direct reaction of phosphine and an aldehyde to prepare a tertiary phosphine suffer from the disadvantages that expensive heavy metal catalysts must be used which usually are very difficult to recover and cannot be recovered unchanged from the reaction mixture.

Accordingly, it is a primary object of this invention to provide an improved and efficient method of preparing tertiary phosphines.

It is another object of this invention to provide an improved and efficient method of preparing tris(hydroxymethyl)phosphines.

Another object of this invention is to provide an industrially advantageous preparation of tertiary phosphines.

Still another object of this invention is to prepare tertiary phosphines in high yields.

These and other objects of the invention will be apparent from the description below.

In this instant, novel discovery, tertiary phosphines are produced by the reaction of phosphonium compounds derived from aldehydes or ketones with an alkali metal sulfite with recovery of a tertiary phosphine from the reaction mass which consists of the tertiary phosphine and alkali metal salts.

The tertiary phosphines are readily separated from the reaction mixture by extraction techniques.

In contrast, when no alkali metal sulfite is used in the reaction, as in prior art techniques, the tertiary phosphines formed are not readily separated from the organic by-products.

The phosphonium compound, often a tetrakis(α-hydroxyorgano) phosphonium compound, capable of forming an aldehyde, a methyl ketone, or a cyclic ketone in a neutral or basic media may be represented by the following general formula:

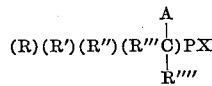

where R, R′, R″, R‴ and R⁗ are selected from the group consisting of alkyl, aryl, cycloalkyl, aralkyl and the like, where R, R′ and R″ can be distinct from or equivalent to

and where R‴ and R⁗ can also be hydrogen, and A may be hydroxy, halogen (Cl, Br and the like), or another radical where the grouping

liberates an aldehyde or ketone in neutral or basic media.

The radicals R, R′, R″, R‴ and R⁗ may also be substituted by halogen, hydroxyl, and the like.

The general grouping X represents any suitable anion of an organic or inorganic acid as defined more fully hereinafter.

Typical examples of aldehyde and ketones which are capable of forming a phosphonium salt, are represented by

in the above formula, where A=OH, are the following:

Formaldehyde, acetaldehyde, propionaldehyde, n-butyraldehyde, isobutyraldehyde, n-valeraldehyde, isovaleraldehyde, n-heptaldehyde, acrolein, crotonaldehyde, furfural, chloral, stearaldehyde, glyoxal, methyl ethyl ketone, acetone, cyclohexanone, methyl butyl ketone, methyl propyl ketone, chloroacetone, diacetyl, acetylacetone, o-chlorobenzaldehyde, p-chlorobenzaldehydes, benzaldehyde, p-chlorobenzaldehyde, o-amino benzaldehyde, anisaldehyde, m-tolualdehyde, p-tolualdehyde, o-nitrobenzaldehyde, m-hydroxybenzaldehyde, p-hydroxybenzaldehyde, salicylaldehyde, p-dimethylaminobenzaldehyde, o-methoxybenzaldehyde, and the like.

In the above general formula, X represents an anion of an inorganic or organic acid. Typical examples of inorganic acids represented by the anion X include arsenious, arsenic, boric, carbonic, chloric, hydrazoic, hydrobromic, hydrochloric, hydrofluoric, hypophosphorous, nitrous, perchloric, phosphoric, phosphorous, pyrophosphoric, silic, sulfuric, sulfurous acids, and the like.

Organic acids represented by the anion X include: aliphatic carboxylic acids containing no more than 9 carbon atoms, such as acrylic, acetic, n-butyric, caproic, caprylic, chloroacetic, bromoacetic, α-chloropropionic, β-chloropropionic, cyanoacetic, dichloroacetic, formic, fluoroacetic, glycolic, n-heptylic, isobutyric, iodoacetic, lactic, methoxyacetic, malonic, phenylacetic, pelargonic, trimethylacetic, trichloroacetic, vinylacetic, and aromatic carboxylic acids containing no more than 12 carbon atoms, such as m-amino-benzoic, p-amino-benzoic, anisic, anthranilic, benzoic, o-bromobenzoic, m-bromobenzoic, p-bromobenzoic, o-chlorobenzoic, m-chlorobenzoic, p-chlorobenzoic, 3,5-dinitrobenzoic, gallic, m-hydroxybenzoic, p-hydroxybenzoic, o-nitrobenzoic, p-nitrobenzoic, m-nitrobenzoic, salicyclic, o-toluic, m-toluic, p-toluic acids and the like.

Typical examples of suitable tetrakis(α-substituted organo)phosphonium compounds which include the tetrakis(α-hydroxyorgano)phosphonium and the tetrakis(α-haloorgano(phosphonium compounds include the following:

(1)        $(HOCH_2)_4PCl$
(2)        $(HOCH_2)_4PBr$ (3) (CH₃CH)₄PCl
        |
        OH (4) (CH₃CH₂CH)₄PBr
         |
         OH (5) (CH₃CH₂CH₂CH)₄PCl
          |
          OH (6) (CH₃CH₂CH₂CH)₄PBr
          |
          OH (7) (CH₂=CHCH)₄PCl
         |
         OH (8) (CH₂=CHCH)₄PBr
         |
         OH (9) (CH₃CH=CHCH)₄PCl
          |
          OH

(10) (CH₃CH=CHCH)₄PBr
           |
           OH

(11) (CH₃COH)₄PCl
         |
         CH₂Cl

(12) (CH₃COH)₄PBr
         |
         CH₂Cl

(13) (ClCH₂COH)₄PCl
           |
           CH₂Cl

(14) (ClCH₂COH)₄PBr
           |
           CH₂Cl

(15) ((CH₃)₂C=CHCOH)₄PCl
              |
              CH₃

(16) (CH₃)₃(HOCH₂)PCl

(17) [(CH₃)₂C=CHCOH]₄PBr
              |
              CH₃

(18) (CH₃)₃(HOCH₂)PBr
(19) (CH₃CH₂)₃(HOCH₂)PCl
(20) (CH₃CH₂)₃(HOCH₂)PBr
(21) (CH₃)(HOCH₂)₃PCl
(22) (CH₃)(HOCH₂)₃PBr
(23) (CH₃CH₂)(HOCH₂)₃PBr
(24) (CH₃CH₂)(HOCH₂)₃PCl

(25) (CH₃—COH)₄PCl
            |
            CH₂CH₃

(26) (CH₃—COH)₄PBr
            |
            CH₂CH₃

(27) (ClCH₂)₄PCl
(28) (ClCH₂)₄PBr
(29) (CH₃)₃(ClCH₂)PCl
(30) (BrCH₂)₄PCl
(31) (BrCH₂)₄PBr
(32) (CH₃)₃(BrCH₂)PCl

(33)      CH₂CH₂
         /      \
     (CH₂        COH)₄PCl
         \      /
          CH₂CH₂

(34)      CH₂CH₂
         /      \
     (CH₂        COH)₄PBr
         \      /
          CH₂CH₂

(35) (C₆H₅CH)₄PCl
          |
          OH

(36) (C₆H₅CH)₄PBr
          |
          OH

(37) (C₆H₅CH)₄PCl
          |
          Cl

(38) (C₆H₅CH)₄PBr
          |
          Cl

(39) (o-CH₃C₆H₄CH)₄PCl
             |
             OH

(40) (o-CH₃C₆H₄CH)₄PBr
             |
             OH

(41) (m-CH₃C₆H₄CH)₄PCl
             |
             OH

(42) (m-CH₃C₆H₄CH)₄PBr
             |
             OH

(43) (p-CH₃C₆H₄CH)₄PCl
             |
             OH

(44) (p-CH₃C₆H₄CH)₄PBr
             |
             OH

(45)          Cl
              |
          (CH₃CH)₄PBr

(46) (CH₃)₃(CH₂)PBr
            |
            Cl

(47) (CH₃)₃(CH₂)PBr
            |
            Br

(48) (CCl₃CH)₄PBr
          |
          OH

(49) (CCl₃CH)₄PCl
          |
          OH

(50) [(CH₃)₂C]₄PCl
          |
          Cl

(51) [(CH₃)₂C]₄PBr
          |
          Cl

Tetrakis(hydroxymethyl)phosphonium halides or tetrakis(halomethyl)phosphonium halides are preferably employed as suitable tetrakis(α-hydroxyorgano)phosphonium compounds.

The compounds utilized in this novel process to convert the organic by-products (usually containing a carbonyl) to an ionic structure capable of being separated by an extraction procedure from the tertiary phosphine formed at the same time include the class of alkali metal sulfites although any compound capable of converting the organic by-products to an ionic structure may be employed.

Suitable alkali metal sulfites that may be employed as a reactant in this instant novel process include sodium, potassium, and lithium sulfites, bisulfites, and mixtures thereof. The term "alkali metal sulfite" as used throughout the description and claims is intended to include at least one of the above alkali metal sulfites or bisulfites.

Although the use of an alkali metal sulfite or bisulfite is preferred, other compounds capable of converting the organic by-products to an ionic structure may be employed as e.g., betaine hydrazide hydrochloride

[(CH₃)₃NCH₂CONANH₂]⁺Cl⁻ which forms a water-soluble quaternary ammonium salt with carbonyl compounds.

The reaction between the alkali metal sulfite or bisulfite and the phosphonium compound is usually carried out under neutral conditions at a pH between about five and 7.5.

An overall general reaction involved in the preparation of tertiary phosphine in accordance with the instant novel invention is represented by the equation:

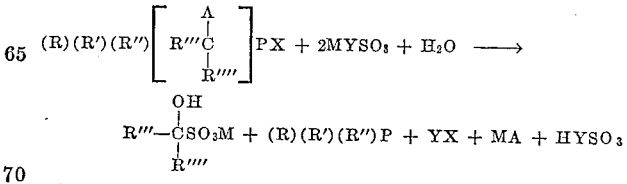

Alternatively the above equation could be written as

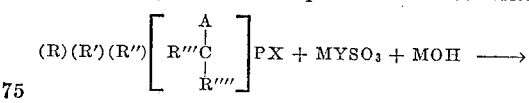

$$R'''-\underset{R''''}{\overset{OH}{\underset{|}{C}}}-SO_3M + (R)(R')(R'')P + YX + MA$$

where R, R', R'', R''' and R'''' are selected from the group consisting of alkyl (branched or straight chain) aryl, cycloalkyl, aralkyl and the like, where R, R' and R'' can be distinct from or equivalent to $$R'''\underset{R''''}{\overset{A}{\underset{|}{C}}}$$

and where R''' and R'''' can also be hydrogen; A being hydroxyl, halogen, or another radical where the grouping $$R'''\underset{R''''}{\overset{A}{\underset{|}{C}}}$$

liberates an aldehyde or ketone in neutral or basic media. The radicals R, R', R'', R''' and R'''' may also be substituted by halogen, hydroxyl and the like.

The general grouping X represents any suitable anion or an organic or inorganic acid as defined more fully heretofore.

M represents an alkali metal, and Y represents an alkali metal or hydrogen.

It is obvious that when A=OH and where $M_2SO_3$ is used, the above equation simplifies to the following general form:

$$(R)(R')(R'')\left(R'''\underset{R''''}{\overset{OH}{\underset{|}{C}}}\right)PX + M_2SO_3 \longrightarrow$$

$$R'''\underset{R''''}{\overset{OH}{\underset{|}{C}}}SO_3M + MX + (R)(R')(R'')P$$

Typical reactions within the scope of this invention are as follows:

(1) $(HOCH_2)_4PCl + M_2SO_3$
$\rightarrow (HOCH_2)_3P + MCl + HOCH_2SO_3M$ (2) $(HOCH_2)_4PCl + MHSO_3 + MOH$
$\rightarrow MCl + (HOCH_2)_3P + HOCH_2SO_3M + H_2O$ (3) 
$$\left[\begin{array}{c}CH_2CH_2\\CH_2\quad\quad C-\\CH_2CH_2\quad OH\end{array}\right]_4 PCl + M_2SO_3 \longrightarrow$$
$$\left[\begin{array}{c}CH_2CH_2\\CH_2\quad\quad C-\\CH_2CH_2\quad OH\end{array}\right]_3 P + MCl + \left[\begin{array}{c}CH_2CH_2\\CH_2\quad\quad C-\\CH_2CH_2\quad OH\end{array}\right] SO_3M$$

(4) $(C_6H_5CH)_4PCl + M_2SO_3 \longrightarrow$
$\quad\quad |$
$\quad\quad OH$
$(C_6H_5CH)_3P + MCl + C_6H_5CHSO_3M$
$\quad\quad |\quad\quad\quad\quad\quad\quad\quad\quad |$
$\quad\quad OH\quad\quad\quad\quad\quad\quad\quad\quad OH$ (5a) $(C_2H_5CH)_4PCl + MOH + M_2SO_3 \longrightarrow$
$\quad\quad\quad |$
$\quad\quad\quad Cl$
$(C_2H_5CH)_3P + 2MCl + C_6H_5CHSO_3M$
$\quad\quad |\quad\quad\quad\quad\quad\quad\quad\quad\quad |$
$\quad\quad Cl\quad\quad\quad\quad\quad\quad\quad\quad\quad OH$ (5b) $(C_6H_5CH)_4PCl + 2M_2SO_3 + H_2O \longrightarrow$
$\quad\quad\quad |$
$\quad\quad\quad Cl$
$(C_6H_5CH)_3P + 2MCl + C_6H_5CHSO_3M + MHSO_3$
$\quad\quad |\quad\quad\quad\quad\quad\quad\quad\quad\quad\quad |$
$\quad\quad Cl\quad\quad\quad\quad\quad\quad\quad\quad\quad\quad OH$ (6a) $(C_6H_5CH)_4PBr + MOH + M_2SO_3 \longrightarrow$
$\quad\quad\quad |$
$\quad\quad\quad Br$
$(C_6H_5CH)_3P + 2MBr + C_6H_5C-SO_3M$
$\quad\quad |\quad\quad\quad\quad\quad\quad\quad\quad |$
$\quad\quad Br\quad\quad\quad\quad\quad\quad\quad\quad OH$ (6b) $(C_6H_5CH)_4PBr + 2M_2SO_3 + H_2O \longrightarrow$
$\quad\quad\quad |$
$\quad\quad\quad Br$
$(C_6H_5CH)_3P + 2MBr + C_6H_5CHSO_3M + MHSO_3$
$\quad\quad |\quad\quad\quad\quad\quad\quad\quad\quad\quad\quad |$
$\quad\quad Br\quad\quad\quad\quad\quad\quad\quad\quad\quad\quad OH$ (7) $(o\text{-, }m\text{-, or }p\text{-})\left(CH_3C_6H_4CH\atop|\atop OH\right)_4PCl + M_2SO_3 \longrightarrow$ $(o\text{-, }m\text{-, or }p\text{-})\left(CH_3C_6H_4CH\atop|\atop OH\right)_3P + MCl + (o\text{-,}m\text{- or }p\text{-})CH_3C_6H_4CHSO_3M$
$\quad\quad\quad\quad\quad\quad\quad\quad\quad\quad\quad\quad\quad\quad\quad\quad\quad\quad\quad\quad |$
$\quad\quad\quad\quad\quad\quad\quad\quad\quad\quad\quad\quad\quad\quad\quad\quad\quad\quad\quad\quad OH$ (8a) $(ClCH_2)_4PCl + M_2SO_3 + MOH$
$\rightarrow (ClCH_2)_3P + HOCH_2SO_3M + 2MCl$ (8b) $(ClCH_2)_4PCl + 2M_2SO_3 + H_2O$
$\rightarrow (ClCH_2)_3P + HOCH_2SO_3M + 2MCl + MHSO_3$ (9a) $(BrCH_2)_4PBr + M_2SO_3 + MOH$
$\rightarrow (BrCH_2)_3P + HOCH_2SO_3M + 2MBr$ (9b) $(BrCH_2)_4PBr + 2M_2SO_3 + H_2O$
$\rightarrow (BrCH_2)_3P + HOCH_2SO_3M + 2MBr + MHSO_3$ (10a) $(CH_3)_3(CH_2)PCl + M_2SO_3 + MOH \longrightarrow$
$\quad\quad\quad\quad |$
$\quad\quad\quad\quad Cl$
$(CH_3)_3P + HOCH_2SO_3M + 2MCl$ (10b) $(CH_3)_3(ClCH_2)PCl + 2M_2SO_3 + H_2O \longrightarrow$
$(CH_3)_3P + HOCH_2SO_3M + 2MCl + MHSO_3$

(11) $(CCl_3CH)_4PCl + M_2SO_3 \longrightarrow$
$\quad\quad |$
$\quad\quad OH$
$(CCl_3CH)_3P + CCl_3CHSO_3M + MCl$
$\quad\quad |\quad\quad\quad\quad\quad\quad |$
$\quad\quad OH\quad\quad\quad\quad\quad\quad OH$ (12a) $[(CH_3)_2C]_4PCl + M_2SO_3 + MOH \longrightarrow$
$\quad\quad\quad\quad |$
$\quad\quad\quad\quad Cl$
$[(CH_3)_2C]_3P + (CH_3)_2C-SO_3M + 2MCl$
$\quad\quad |\quad\quad\quad\quad\quad\quad\quad |$
$\quad\quad Cl\quad\quad\quad\quad\quad\quad\quad OH$ (12b) $[(CH_3)_2CCl]_4PCl + 2M_2SO_3 + H_2O \longrightarrow$
$[(CH_3)_2CCl]_3P + (CH_3)_2CSO_3M + 2MCl + MHSO_3$
$\quad\quad\quad\quad\quad\quad\quad\quad\quad\quad |$
$\quad\quad\quad\quad\quad\quad\quad\quad\quad\quad OH$

(13) $(C_2H_5)_3(HOCH_2)PCl + M_2SO_3$
$\rightarrow (C_2H_5)_3P + HOCH_2SO_3M + MCl$

(14) $(C_2H_5)_3(HOCH_2)PBr + M_2SO_3$
$\rightarrow (C_2H_5)_3P + HOCH_2SO_3M + MBr$

(15) $(C_2H_5)(HOCH_2)_3PCl + M_2SO_3$
$\rightarrow (C_2H_5)(HOCH_2)_2P + HOCH_2SO_3M + MCl$

(16) $(C_2H_5)_2(HOCH_2)_2PCl + M_2SO_3$
$\rightarrow (C_2H_5)_2(HOCH_2)P + HOCH_2SO_3M + MCl$ (17a) $[(CH_3)(C_2H_5)C]_4PCl + M_2SO_3 + MOH \longrightarrow$
$\quad\quad\quad\quad\quad |$
$\quad\quad\quad\quad\quad Cl$
$[(CH_3)(C_2H_5)C]_3P + 2MCl + \underset{C_2H_5}{\overset{CH_3}{\underset{|}{\overset{|}{C}}}}-SO_3M + 2MCl$
$\quad\quad |\quad\quad\quad\quad\quad\quad\quad\quad\quad\quad\quad |$
$\quad\quad Cl\quad\quad\quad\quad\quad\quad\quad\quad\quad\quad\quad OH$ (17b) $[(CH_3)(C_2H_5)CCl]_4PCl + 2M_2SO_3 + H_2O \longrightarrow$
$\quad\quad\quad\quad\quad\quad\quad\quad\quad\quad\quad\quad\quad\quad\quad OH$
$\quad\quad\quad\quad\quad\quad\quad\quad\quad\quad\quad\quad\quad\quad\quad |$
$[(CH_3)(C_2H_5)CCl]_3P + 2MCl + (CH_3)(C_2H_5)C-SO_2M +$
$2MCl + MHSO_3$ (18a) $(CH_3)_3(CH_2)PBr + M_2SO_3 + MOH \longrightarrow$
$\quad\quad\quad\quad |$
$\quad\quad\quad\quad Br$
$(CH_3)_3P + HOCH_2SO_3M + 2MBr$ (18b) $(CH_3)_3(CH_2Br)PBr + 2M_2SO_3 + H_2O \longrightarrow$
$(CH_3)_3P + HOCH_2SO_3M + 2MBr + MHSO_3$ (19a) $[(CH_3)_2C]_4PBr + M_2SO_3 + MOH \longrightarrow$
$\quad\quad\quad\quad |$
$\quad\quad\quad\quad Br$
$[(CH_3)_2C]_3P + (CH_3)_2C-SO_3M + 2MBr$
$\quad\quad |\quad\quad\quad\quad\quad\quad\quad |$
$\quad\quad Br\quad\quad\quad\quad\quad\quad\quad OH$ (19b) $[(CH_3)_2CBr]_4PBr + 2M_2SO_3 [(CH_3)_2CBr]_3P +$
$(CH_3)_2C-SO_3M + 2MBr + MHSO_3$
$\quad\quad |$
$\quad\quad OH$ In carrying out this instant novel process, the phosphonium compound, alkali metal sulfite and solvent are mixed and brought into solution in a reactor with suitable agitation means. Suitable solvents include water and the lower alcohols (as methanol, ethanol, isopropanol and the like), although other solvents which could effect complete solution of the above reaction mixture may be used.

In some cases, if desired, a base may also be part of the reaction mixture (in alternate to the use of more alkali metal sulfite and water), as illustrated by the heretofore given general and specific equations.

Typical examples of basic compounds which may be employed include the alkali metal hydroxides (e.g. sodium hydroxide, potassium hydroxide, and the like), sodium carbonate, potassium carbonate, guanidine, tetraphenylguanidine, and mixtures thereof. In fact, any basic compound which does not interfere in itself or in its formed salts with the isolation of the tertiary phosphine may be employed. However, sodium hydroxide is preferably employed as the basic compound.

Sufficient alkali metal sulfite (and base, if desired) must be added to the reaction mixture to provide at least the stoichiometric amount necessary to neutralize the "X" anion component of the phosphonium compound and to form an alkali metal bisulfite salt with the liberated organo radical of the phosphonium compound.

A stoichiometric excess of the alkali metal sulfite is preferred, most preferably between about five and about two hundred percent stoichiometric excess, but any suitable excess may be employed.

The alkali metal sulfite, the phosphonium compound, water and/or a suitable solvent, and a base (if desired) may be added to the reaction vessel as solids, aqueous or solvent slurries, or aqueous or solvent solutions. The amount of water and/or solvent used should be sufficient to disolve the reactants, but preferably a ten to about a thousand percent excess of water and/or solvent is used.

Any convenient order of mixing the reactants may be used, or they may be added simultaneously, but preferably the alkali metal sulfite, the phosphonium compound, and a base (if desired), are first admixed with water or a suitable solvent and mixed at room temperature or at temperatures less than about eighty-five degrees centigrade until complete solution has been obtained.

It is important that the pH of the above described solution be at or be immediately adjusted to a neutrality range of about four to about seven and one-half, preferably between about five to seven. This prevents the side reaction involving the preparation of a tertiary phosphine oxide to be effected.

In this case, this undesirable side reaction usually takes place accompanied by the evolution of hydrogen.

If desired, the reaction solution or the reactants may be adjusted to the above described neutrality pH range by the addition of a suitable acidic component before, during or after admixing and/or solution. Strong mineral and/or organic acids or mixtures thereof may be employed. In fact, any desired acid may be employed for the above described adjustment of pH if said acid or its derived salts do not interfere with the isolation of the desired tertiary phosphine. Strong mineral acids, strong carboxylic acids, strong aromatic carboxylic acids, benzene derivatives with acidic side chains, or mixtures thereof may be employed.

Typical strong mineral acids include arsenic, hydrochloric, hypophosphorous, phosphorous, phosphoric, sulfurous, hydrobromic acid and the like, or mixtures thereof. Strong carboxylic acids include formic acid, fluoro, chloro, or bromoacetic acid, di- or trichloroacetic acid, 2-chloropropionic acid, glycolic acid, lactic acid, methoxyacetic acid, thioglycolic acid, glyoxalic acid, malonic acid and the like or mixtures thereof. Typical strong aromatic carboxylic acids include o- or m-halobenzoic acids, o-, m- or p-nitrobenzoic acid, 3,5-dinitrobenzoic acid, salicyclic acid, and the like, or mixtures thereof.

Examples of benzene derivatives with acidic side chains include phenyl, propiolic and o-phenylene diacetic acid and the like, and mixtures thereof.

Examples of benzene derivatives with acidic side chains include phenyl, propiolic and o-phenylene diacetic acid and the like, and mixtures thereof.

Heating of the reaction mass during solution or during distillation of the water may be effected at any temperature less than about eighty-five degrees centigrade, but preferably between about twenty-five to seventy degrees centigrade.

The reaction mass containing the tertiary phosphine and by-product salts (often a mixture of an inorganic alkali metal salt and an alkali metal bisulfite salt of an aldehyde, methyl ketone, or cyclic ketone) may be worked up to effect the isolation of the tertiary phosphine before or after the distillation of the bulk of the water and/or the solution means.

In either of the above said cases, the tertiary phosphine may be readily isolated from the ionic by-products by solvent extraction means. In contrast, when no alkali metal sulfite or similar acting agent is employed in the reaction, relatively non-ionic organic by-products (or free aldehydes or ketones) are formed in the reaction mass. These organic by-products are difficult to separate from the tertiary phosphine, and thus costly purification steps are necessary in order to isolate a pure tertiary phosphine from the said reaction mass.

Solvent extraction is preferably employed to separate said tertiary phosphine from the reaction mass before or after the distillation of the bulk of the water and/or the solution means, although other processes such as ion occlusion, which, in essence, differentiate from the tertiary phosphine and the accompanying by-product ionic compounds may be employed. Another alternate process involves the use of an ion exchange technique to separate the desired tertiary phosphine from the by-products.

In one modification of the separation technique, the reaction mass containing water and/or other solvent means, is mixed with an immiscible solvent for the tertiary phosphine in the reaction mass. The tertiary phosphine contained in said immiscible solvent is isolated from the insoluble and immiscible components, and then the isolation of the tertiary phosphine is effected by distillation of the immiscible solvent, preferably under vacuum.

In another modification of the above, the reaction mass may be admixed with any solvent for the tertiary phosphine—even if miscible—and the water and/or neutral solvent means can then be distilled (or azeotroped) from the reaction mixture leaving a residue of the desired tertiary phosphine dissolved in its solvent and the insoluble by-products. After filtration, the desired tertiary phosphine may be isolated by distillation of its solvent, preferably under vacuum.

In yet another modification of the above separation technique, the reaction mass containing water and/or other solvent means is transferred into a solvent for the tertiary phosphine in which the accompanying ionic by-products are insoluble. After filtration, the desired tertiary phosphine can be isolated by distillation of the accompany solvents—preferably under vacuum. The preferred method involves the distillation of the solvent means (often water), from the reaction mass, preferably under vacuum. The tertiary phosphine contained in the residue is now extracted from the ionic by-products by the use of a suitable solvent. Often the slurry of the tertiary phosphine, ionic by-products, and a small amount of solvent for the tertiary phosphine may be retained as a cake, or on some filtration means. The desired tertiary phosphine is extracted by repeated washing with a suitable solvent at any temperature less than eight-five degrees centigrade, but preferably between about twenty-five to seventy degrees centigrade.

The desired tertiary phosphine is then isolated by distillation of the solvent means, preferably under vacuum.

Suitable solvents for the desired tertiary phosphines in which the ionic by-products are relatively insoluble include methanol, ethanol, isopropanol, butanol, isobutanol, acetone, pyridine, dimethyl formamide, trimethylphosphate, hexanol, pentanol, and the like or mixtures thereof. (If desired, the sulfite-organic by-product (often a bisulfite salt of the by-product aldehyde or ketone) may be decomposed with strong acid or strong base to recover the sulfite and/or the organic components.)

It is important in any of the above processes to protect the tertiary phosphine at any stage from atmospheric oxygen, and especially in the isolated stage, from atmospheric oxygen or moisture as illustrated in the following examples:

The resulting tertiary phosphine is obtained by the above described processes in high yield and purity.

The following examples are presented to further illustrate the invention without any intention of being limited thereby.

*Example 1*

One thousand grams of tetrakis(hydroxymethyl)phosphonium chloride were dissolved in fifteen hundred cc. of distilled water at fifty degrees centigrade. When all of the tetrakis(hydroxymethyl)phosphonium chloride was dissolved, six hundred and seventy-five grams of sodium sulfite were added, then the pH of the aqueous tetrakis-(hydroxymethyl)phosphonium chloride solution was adjusted to five by adding twenty milliliters of concentrated HCl. All of the above operations were effected under a blanket of nitrogen. The water was evaporated off to a thick slurry under vacuum. Next the slurry was taken up in fifteen hundred milliliters of n-butyl alcohol at fifty degrees centigrade with vigorous stirring, transferred under nitrogen pressure to a nitrogen filled pressure filter, and then filtered under ten pounds nitrogen pressure. The resulting filter cake was washed with two thousand cc. of n-butyl alcohol at fifty degrees centigrade. The filtered solution of butanol and tris(hydroxymethyl)phosphine was transferred under a blanket of nitrogen to a five liter distilling flask, and the vacuum distillation of the butanol water azeotrope followed by the butanol was carried out. The residue was transferred to a wide mouth jar, seeded, and placed in a refrigerator overnight. The resulting crude tris(hydroxymethyl)phosphine was obtained in nearly theoretical amount. The crude crystalline tri(hydroxymethyl)phosphine was triturated with absolute ether, pressure filtered using nitrogen, and vacuum dried.

The resulting white, crystalline, tris(hydroxymethyl) phosphine, melting point fifty to fifty-three degrees centigrade (corrected) formed adducts with benzoquinone and with mercuric chloride (melting point of $HgCl_2$ adduct, one hundred and thirty-five to one hundred and thirty-seven degrees), and showed a rapid rise in temperature on reaction with thirty percent $H_2O_2$; whereas phosphine oxides gave negative tests in all of the three cases above. Redox type analyses indicated that essentially pure tris(hydroxymethyl)phosphine had been obtained in this preparation.

*Example 2*

The process of Example 1 was repeated using tetrakis(hydroxymethyl)phosphonium bromide with recovery of tris(hydroxymethyl)phosphine of good yield and purity.

*Example 3*

The process of Example 1 was repeated using tetrakis(hydroxymethyl)phosphonium acetate with recovery of tris(hydroxymethyl)phosphine of good yield and purity.

*Example 4*

The process of Example 1 was repeated using tetrakis(chloromethyl)phosphonium chloride with recovery of tris(chloromethyl)phosphine of good yield and purity.

Various changes and modifications may be made in the method and apparatus of this invention, certain preferred forms of which have been herein described, without departing from the spirit and scope of this invention. These modifications of this basic invention are to be regarded as within the scope and purview of this invention.

This invention is not to be considered as limited in scope by any of the foregoing examples, which are included for illustrative purposes only, but is to be limited solely by the terms of the appended claims.

We claim:
1. The process for the production of a tertiary phosphine which comprises contacting, in a substantially non-alkaline medium, the substance selected from the group consisting of alkali metal sulfite, alkali metal bisulfite and admixtures thereof with a phosphonium compound having the following general formula:

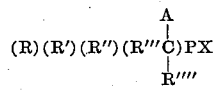

where R, R' and R" are radicals selected from the group consisting of alkyl, aryl, cycloalkyl, arylalkyl

and hydroxy and halogen substituted derivatives thereof; and where R''' and R'''' are radicals selected from the group consisting of alkyl, aryl, cycloalkyl, arylalkyl, hydrogen, and hydroxy and halogen substituted derivatives thereof; and where A is a radical selected from the group consisting of hydroxyl and halogen, and where X is an anion of an acid.

2. The process of claim 1 wherein R''' and R'''' are hydrogen.

3. The process of claim 1 wherein said acid is an organic acid.

4. The process of claim 1 wherein said acid is an inorganic acid.

5. The process of claim 1 wherein the phosphonium compound is

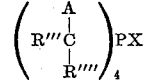

and the tertiary phosphine formed is represented by formula:

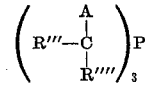

where R''' and R'''' are radicals selected from a group consisting of alkyl, aryl, cycloalkyl, arylalkyl, hydrogen and hydroxy and halogen substituted derivatives thereof; and A is selected from the group consisting of hydroxyl and halogen.

6. The process of claim 1 wherein the reaction is carried out in the presence of an inert liquid solvent.

7. The process of claim 2 wherein the reaction is carried out in the presence of an inert liquid solvent.

8. The process of claim 3 wherein the reaction is carried out in an inert liquid solvent.

9. The process of claim 4 wherein the reaction is carried out in an inert liquid solvent.

10. The process of claim 5 wherein the reaction is carried out in the presence of an inert liquid solvent.

11. The process of claim 5 wherein the phosphonium compound is

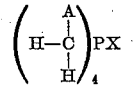

and the tertiary phosphine formed is represented by the formula:

$$(AH_2C)_3P$$

wherein A is a radical selected from the group consisting of hydroxyl and halogens, and wherein the reaction is carried out in the presence of water.

12. The process of claim 5 wherein the phosphonium compound is $(HOCH_2)_4PCl$ and the tertiary phosphine formed is represented by the general formula:

$$(HOCH_2)_3P$$

and wherein the reaction is carried out in the presence of water.

No references cited.

TOBIAS E. LEVOW, *Primary Examiner.*

LEON D. ROSDOL, *Examiner.*

L. A. SEBASTIAN, F. R. OWENS, *Assistant Examiners.*